United States Patent [19]

Katada et al.

[11] 4,144,854
[45] Mar. 20, 1979

[54] IGNITION APPARATUS FOR INTERNAL COMBUSTION ENGINE

[75] Inventors: Hirosi Katada, Nakamachi; Nobuhiko Ogasawaia, Mito; Hideyuki Hashimoto, Katsuta, all of Japan

[73] Assignee: Hitachi, Ltd., Japan

[21] Appl. No.: 802,464

[22] Filed: Jun. 1, 1977

[30] Foreign Application Priority Data

Jun. 9, 1976 [JP] Japan .................................. 51-67315

[51] Int. Cl.$^2$ ................................................ F02P 5/04
[52] U.S. Cl. ......................... 123/117 R; 123/148 CC; 123/149 C
[58] Field of Search ........ 123/117 R, 179 BG, 149 C, 123/149 D, 149 R, 149 A, 149 F, 149 E, 148 CC

[56] References Cited

U.S. PATENT DOCUMENTS

| | | | |
|---|---|---|---|
| 3,851,198 | 11/1974 | Minks et al. ..................... | 123/149 C |
| 3,941,103 | 3/1976 | Hartig ............................... | 123/117 R |
| 3,948,239 | 4/1976 | Katsumata ....................... | 123/149 C |
| 3,952,715 | 4/1976 | Van Siclen, Jr. ................. | 123/117 R |
| 3,974,815 | 8/1976 | Katsumata ....................... | 123/117 R |
| 4,020,807 | 5/1977 | Del Zotto et al. ............... | 123/117 R |

*Primary Examiner*—Charles J. Myhre
*Assistant Examiner*—Raymond A. Nelli
*Attorney, Agent, or Firm*—Craig & Antonelli

[57] ABSTRACT

There is proposed an ignition apparatus for use with an internal combustion engine, including therein an ac or dc power source and an ignition coil whose primary winding together with a controllable electric switching element forms a closed circuit. The apparatus includes therein a control circuit for controlling the electric switching element, which control circuit comprising a first, second, and third signal generating means for supplying control signals to the control electrodes of the switching element in synchronism with the ignition timing of the engine. The third signal generating means detects the spark positions, i.e. angular positions of the engine shaft at which the spark plugs are to be fired, at high speeds of the engine so that the maximum advance in angular position for ignition timing can be suppressed.

4 Claims, 13 Drawing Figures

$N < N_2$ $N > N_3$

IGNITION APPARATUS FOR INTERNAL COMBUSTION ENGINE

BACKGROUND OF THE INVENTION

1. Field of the Invention

This invention relates to an ignition apparatus for use with an internal combustion engine and more particularly to an ignition apparatus for use with a combustion engine, applicable to various engines having a variety of ignition advance characteristics.

2. Description of the Prior Art

An ignition apparatus of the condenser-discharge type is preferably used with the conventional ignition apparatus for a motor-cycle (two-wheeled motor vehicle). In general, the ignition advance of an ignition apparatus is controlled by controlling an electric switching element which forms a closed circuit with the primary winding of an ignition coil. Usually, such an ignition apparatus has a first signal generating means which operates at the low speed of the engine and a second signal generating means which operates at the high speed of the engine. And the spark timing at high revolution numbers is so determined that the increase in the signal voltage due to the increase in the number of revolutions of the engine may be suppressed by the delay of the current through the second signal generating coil due to the inductance of the coil.

The respective signals share in controlling of the ignition timing of the engine at the respective speed regions of low, middle and high, and the connection between the regions is conducted continuously and automatically.

SUMMARY OF THE INVENTION

The object of the present invention is to provide an ignition apparatus for use with an internal combustion engine, furnished with an ignition advancing means applicable to engines having various ignition advance characteristics.

According to this invention, there is provided an ignition apparatus for use with an internal combustion engine, including therein an ac or dc power source and an ignition coil whose primary winding forms a closed circuit together with a controllable electric switching element. The ignition apparatus further comprises a control circuit for controlling the electric switching element and the control circuit has a first, second and third signal generating means for supplying control signals to the control electrode of the switching element in synchronism with an ignition timing of the engine.

DESCRIPTION OF THE PREFERRED EMBODIMENT

Figure 1:
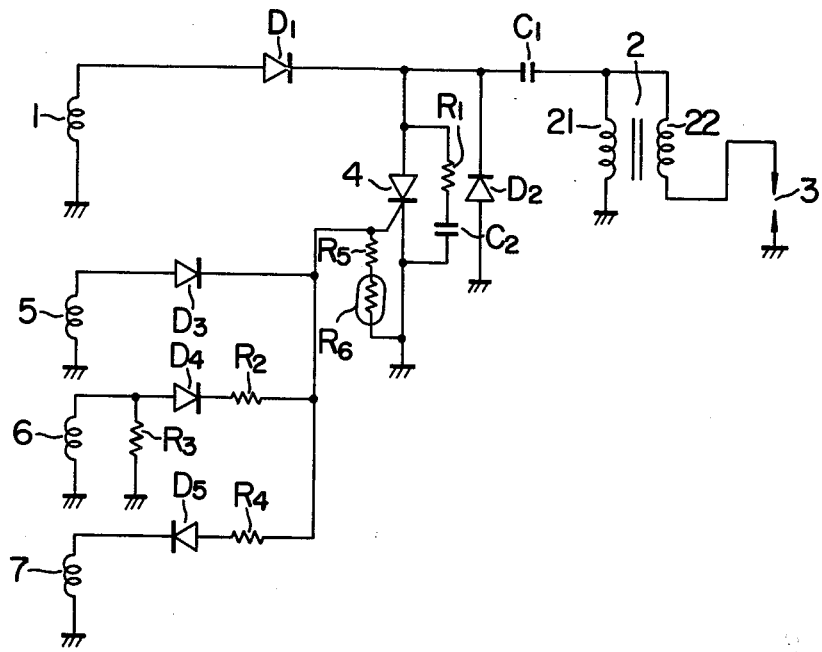
FIG. 1 shows a circuit of an ignition apparatus as an embodiment of this invention.

In FIG. 1, reference numeral 1 indicates an ac power source mounted on, for example, a two-wheeled motorcar, such as the generating coil of a flywheel carrying one or more magnets, or a magnetogenerator of the rotating armature type, the generating coil developing a voltage whose amplitude varies depending upon the rotational speed of the engine. One end of the generating coil 1 is connected with the reference potential (ground) and the other end of the coil 1 is connected with the primary winding 21 of an ignition coil 2, one end of which is grounded, through a rectifying diode D1 and a capacitor C1 for storing spark energy. The secondary winding 22 of the ignition coil 2 is connected to ground via a spark plug 3. A rectifier 4 provided with a control electrode (hereafter referred to as a thyristor) has its anode connected with the cathode of the diode D1 and its cathode grounded. A diode D2 is provided to serve as a path for the oscillating current from the capacitor C1. Between the anode and the cathode of the thyristor 4 is connected a series circuit of a resistor R1 and a capacitor C2 to bypass or absorb the surge current which could flow through the thyristor 4 if the series circuit were omitted. A series circuit formed of a resistor R5 and a thermistor R6, connected between the gate of the thyristor 4 and ground, performs the control of the gate trigger level of the thyristor 4 and the temperature compensation. Signal generating means is formed by a first spark (ignition) signal generating coil 5 for using an output at low speed of the engine, a second spark signal generating coil 6 for using an output when the ignition is being advanced, and a third spark signal generating coil 7 for using an output at high speed of the engine. The first, second and third signal generating coils 5, 6 and 7 are connected in common with the gate of the thyristor 4 respectively through a forward-connected diode D3, a forward-connected diode D4 and a voltage-regulating resistor R2, and a reverse-connected diode D5 and a voltage-regulating resistor R4.

The operation of the circuit referred to above will be described with the aid of FIGS. 2-5. After the engine has been started, the ac source 1 delivers an output corresponding to the number of revolutions of the engine and the output is stored in the capacitor C1 to prepare for spark discharge.

Figure 2:
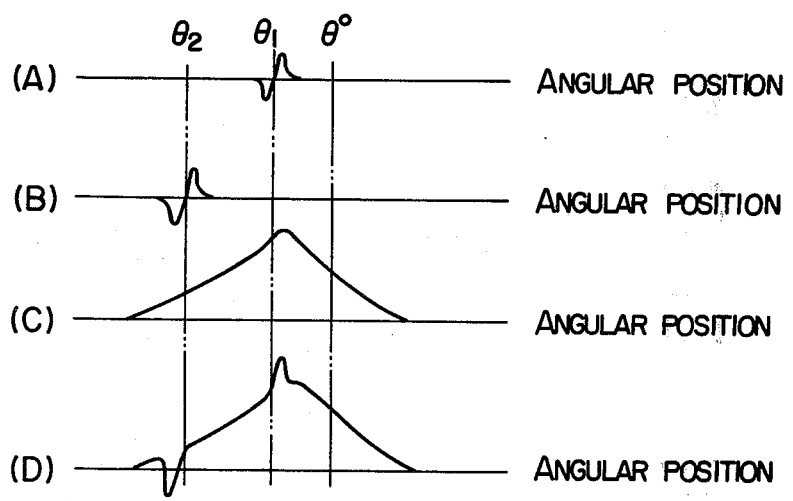
FIGS. 2(A), 2(B), 2(C) and 2(D) respectively show the output waveforms of the signal generating means in FIG. 1 and the waveform of the control signal for the switching element.

The spark signal generating coils 5, 6 and 7 also deliver outputs responsive to the rotation of the engine, the output waveforms of the coils being as shown in FIG. 2. Namely, the first spark signal generating coil 5 produces a pulse-like waveform appearing at angular position $\theta_1$ before the upper dead point $\theta_0$ of the engine, as shown in FIG. 2(A); the second spark signal generating coil 6 produces a fanning-out waveform having its peak at $\theta_1$, as shown in FIG. 2(C); and the third spark signal generating coil 7 produces a pulse-like waveform appearing at $\theta_2$, as shown in FIG. 2(B). The synthesized waveform is as shown in FIG. 2(D) and the resultant waveform has a concave portion at angular position $\theta_2$, due to the waveform generated by the third coil 7.

Figure 3:
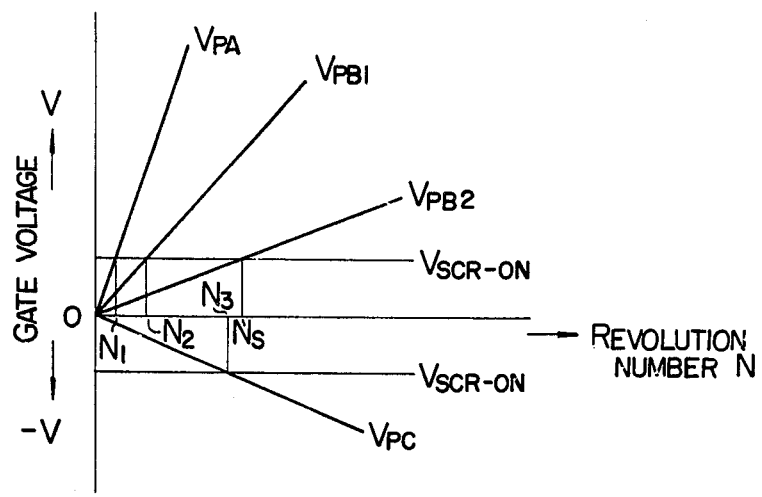
FIG. 3 shows the amplitudes of signal voltage vs rotations per unit time.

FIG. 3 shows the amplitudes of the output voltages of the spark signal generating coils 5, 6 and 7. The amplitude $v_{PA}$ of the output voltage produced by the coil 5 reaches the voltage $V_{SCR-ON}$ for firing the thyristor 4 at the revolution number $N_1$, the amplitude $v_{PB1}$ of the peak of the output voltage of the coil 6 during the period of ignition advance reaches the firing voltage $V_{SCR-ON}$ at the revolution number $N_2$, and the amplitude $v_{PB2}$ of the voltage corresponding to the descending curve ($\theta_2$ in FIG. 2) attains the firing level $V_{SCR-ON}$ at the revolution number $N_s$. The amplitude $v_{PC}$ of the output voltage of the coil 7 is negative and reaches the firing level $V_{SCR-ON}$ at the revolution number $N_3$. Accordingly, at low numbers of revolutions of the engine, the output voltages of the sparks signal generating coils 5, 6 and 7 are all low and only the output voltage of the coil 5 reaches the trigger level $V_{SCR-ON}$ for firing the thyristor 4 at $N_1$ revolutions, as shown in FIG. 5. As a result, the thyristor 4 is fired at an ignition timing for low speed. As the number of revolutions increases until the output of the coil 6 becomes as high as shown in FIG. 4(B), the trigger level is reached at $N_2$, as shown in FIG. 5, to advance the ignition timing. When the number of revolutions increase further to cause the spark to occur at angular position $\theta_2$ for high speed ignition timing, the third coil 7 operates to generate a negative signal voltage, as shown in FIG. 3. When the negative voltage $v_{PC}$ reaches the trigger level as shown in FIG. 4(C), by the negative signal voltage the signal voltage is restricted at the region prior to the angular position $\theta_2$. Namely, since the signal voltage is kept lower than the trigger level of the thyristor 4 by the negative signal, even if the revolutions of the engine increases further, further ignition advance does not take place so that the ignition timing is fixed. See the flat portion of this invention's curve in FIG. 5.

Figure 6:
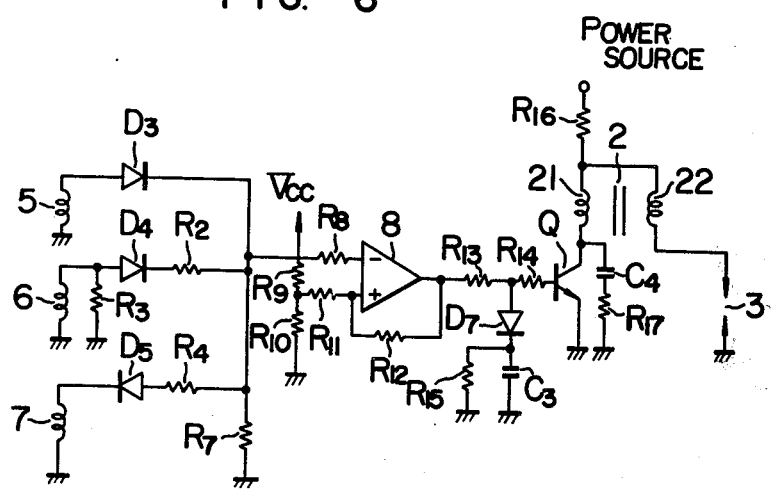
FIG. 6 shows a circuit of an ignition apparatus as another embodiment of this invention.

In the above embodiment, this invention is applied to an ignition apparatus of the condenser-discharge type, but it can also be applied to an ignition apparatus of current-interruption type, as shown in FIG. 6.

FIG. 6 shows a circuit of an ignition apparatus of the current-interruption type. In FIG. 6, a spark signal generating means comprising spark signal generating coils 5, 6 and 7, diodes D3, D4 and D5 and resistors R2, R3 and R4, is identical in function with the spark signal generating means shown in FIG. 1. A resistor R7 serves to adjust the level of the waveform of the signal obtained by synthesizing the outputs of the spark signal generating coils 5, 6 and 7. The synthesized signal is supplied to a comparison circuit consisting of a comparator 8 and resistors R8 to R12 and when the signal is higher than a certain level, a transistor Q is turned off. The resistor R12 is so used that the comparison level may have a hysterisis characteristic. The resistors R13 and R14 are connected in series with the base of the transistor Q so as to restrict the base current of the transistor Q. A circuit formed by a combination of a diode D7, a resistor R15 and a capacitor C3 is connected between the base and emitter of the transistor Q so as to moderate the rising gradient of current through the conducting transistor Q and to prevent the spark plug from firing when the transistor Q is conducting. A series circuit of a capacitor C4 and a resistor R17, connected between the emitter and the collector of the transistor Q, serves to absorb a surge current to the transistor Q. A resistor R16 connected in series with the primary winding of the ignition coil 2 serves to restrict the current through the primary winding.

In the ignition apparatus as described above, a high voltage is induced across the secondary winding of the ignition coil 2 by making a sudden change in the primary current by cutting off the transistor Q and the high voltage establishes a spark across the spark gap of the spark plug 3.

Figure 4:
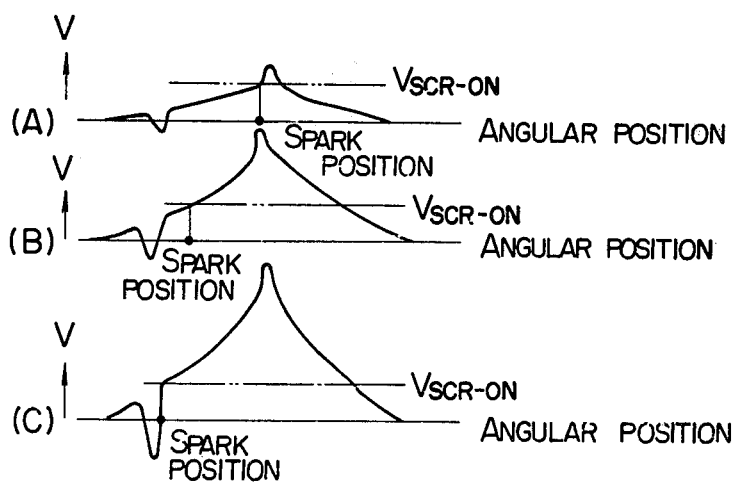
FIGS. 4(A), 4(B) and 4(C) show respectively the waveforms of the signal voltages delivered from the signal generating means in FIG. 1.
Figure 5:
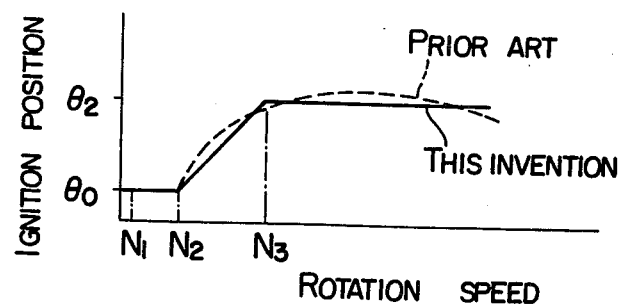
FIG. 5 shows the ignition advance characteristic obtained according to the embodiment shown in FIG. 1.

In this embodiment, the timing of the transistor Q being cut off corresponds to the preset level of the comparison circuit designed equal to the trigger level $V_{SCR-ON}$ in the previous embodiment, as shown in FIG. 4. Accordingly, a desired ignition advance characteristic can be obtained also with a transistorized ignition apparatus.

In the above two embodiments, the ignition advance characteristic for high speeds of revolution is fixed by utilizing the negative voltage induced in the third spark signal generating coil. Now, there will be described below circuits for fixing such an ignition advance characteristic for high speeds of revolution of the engine by utilizing the voltage induced in the second spark signal generating coil.

Figure 7:
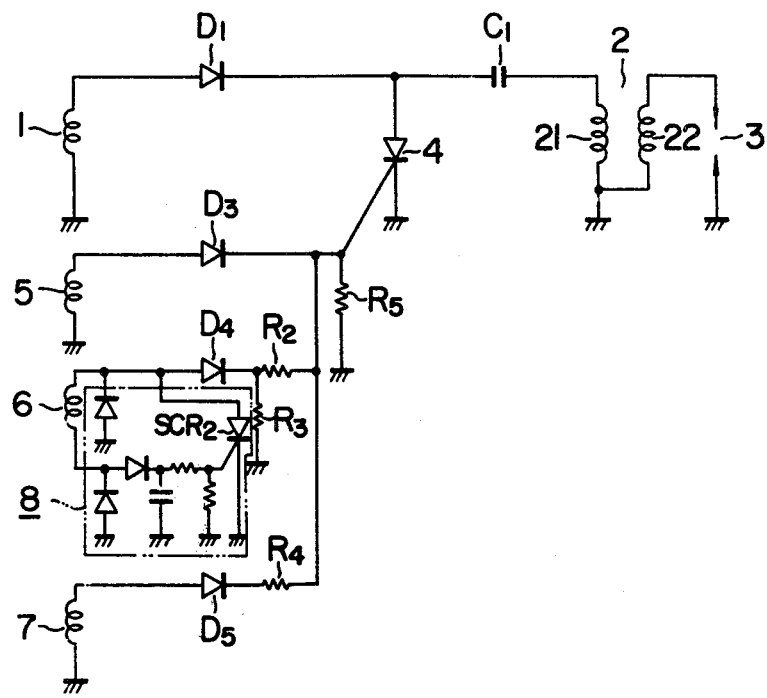
FIG. 7 shows a circuit of an ignition apparatus as yet another embodiment of this invention.

In FIG. 7, only parts not appearing in FIG. 1 will be described. The second spark signal generating coil 6 is provided at its output end with a control circuit 8 having a thyristor SCR2 controlled by the negative voltage from the signal generating coil. When the ignition timing advances up to the maximum ignition advance point theoretically obtained, the thyristor SCR2 fires with the increase in voltage to short-circuit the coil 6. The positive end of the third spark signal generating coil 7 is connected with the gate of the thyristor 4 through a forward-connected diode D5 and a resistor R4 for regulating the level of the signal.

Figure 8:
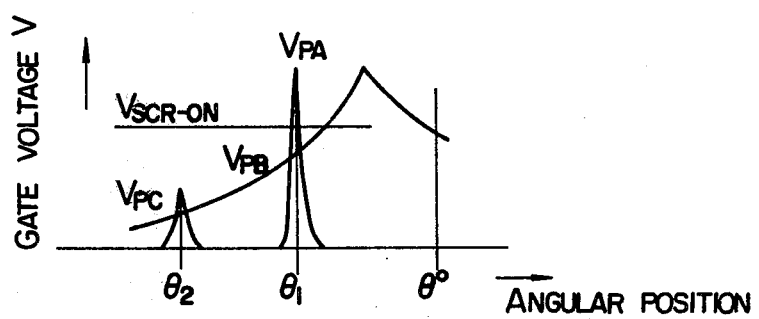
FIG. 8 shows the output waveforms of the signal generating means in FIG. 7.
Figure 9:
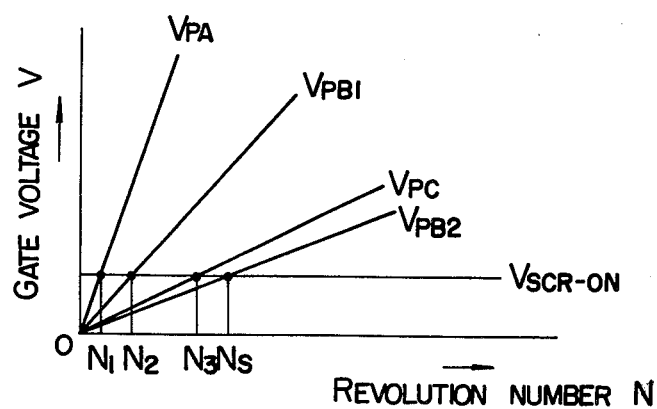
FIG. 9 shows the amplitudes of the signal voltages with respect to the rotations per unit time, generated in the circuit in FIG. 7.

FIG. 8 shows the relationship between the waveforms of the voltages $v_{PA}$, $v_{PB}$ and $v_{PC}$ applied from the coils 5, 6 and 7 to the control electrode, i.e. gate, of the thyristor 4 and the angular positions at which they appear. Namely, the voltages $v_{PA}$ and $v_{PC}$ are pulse-like while the voltage $v_{PB}$ fans out toward the bottom. The voltages $v_{PC}$, $v_{PB}$ and $v_{PA}$ have the degrees of phase advance increasing in the order mentioned. Viewed from the reference position (top dead point), $v_{PC}$ assumes the maximum ignition advance position $\theta_2$ and $v_{PA}$ the initial position $\theta_1$. FIG. 9 shows the amplitudes of the voltages $v_{PA}$, $v_{PB}$ and $v_{PC}$. The voltages $v_{PA}$ and $v_{PC}$ reach the firing level $V_{SCR-ON}$ of the thyristor 4 respectively at $N_1$ and $N_3$. The voltage $v_{PB}$ is so designed as to assume $\theta_0$ at $N_2$ and $\theta_2$ at $N_s$.

Figure 10:
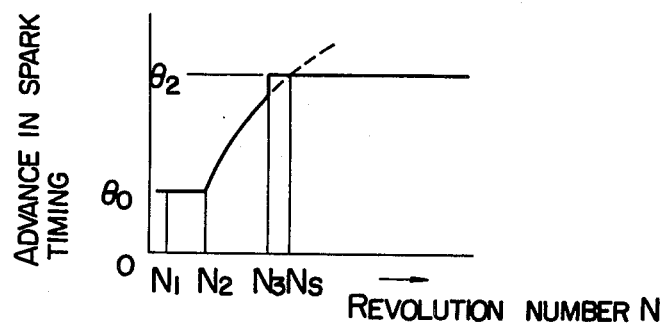
FIG. 10 shows the ignition advance characteristic obtained according to the embodiment shown in FIG. 7.

FIG. 10 shows the relationship between the rotary speeds and the angular positions at which each of the voltages obtained as the above reaches the firing voltage $V_{SCR-ON}$ of the thyristor 4.

Namely, as regards the first or third spark signal generating coil 5 and 7, the angular positions, starting with the revolution numbers $N_1$ and $N_2$ respectively, become constant at $\theta_0$ and $\theta_2$ while as regards the second spark signal generating coil 6, the angular position starts with the revolution number $N_2$, advances up to $\theta_2$ at $N_s$ and further advances, as shown by a dotted line in FIG. 10. If the control circuit described above is so designed as to operate for $N_2 < N_3 < N_s$, the output voltage $v_{PB}$ of the coil 6 is short-circuited and therefore vanishes at revolution numbers greater than $N_s$. As shown in FIG. 10, the ignition advance characteristic according to this invention is such that the initial position $\theta_0$ is assumed for $N_1 - N_2$, the ignition is advanced for $N_2 - N_3$ and the maximum ignition advance point $\theta_2$ is kept constant after the stepwise change at $N_3$.

Figure 11:
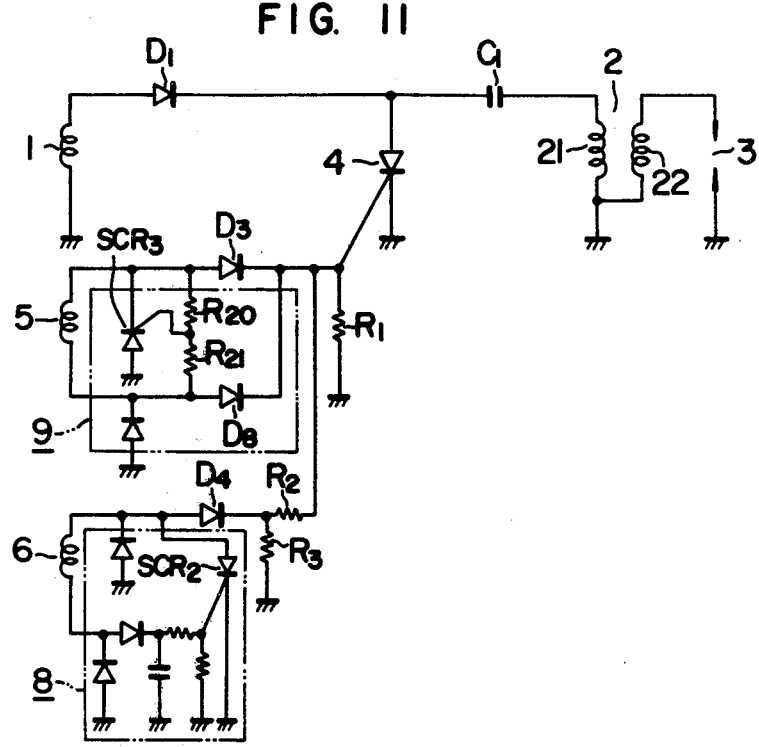
FIG. 11 shows a circuit of an ignition apparatus as a further embodiment of this invention.
Figure 12:
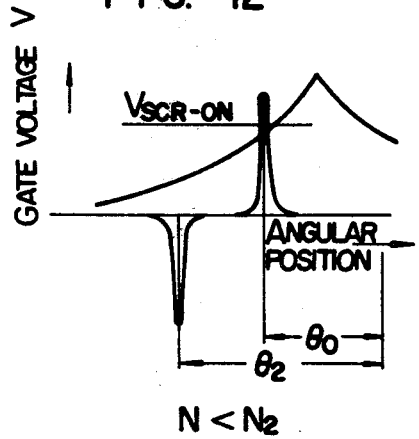
FIG. 12 shows the output waveforms of the signal generating means in FIG. 11.
Figure 13:
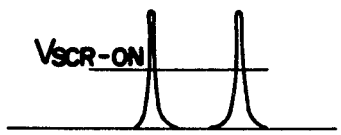
FIG. 13 shows the shaped versions of the signal waveforms shown in FIG. 12.

FIG. 11 shows an ignition apparatus as another embodiment of this invention, in which like characters designate corresponding parts as in FIG. 7. This embodiment uses two spark signal generating coils 5 and 6 and the associated control circuits 8 and 9. In this embodiment, the spark signal generating means is so constructed as to generate spark signals as shown in FIG. 12. The control circuit 9 is connected in parallel with the spark signal generating coil 5 and consists mainly of resistors R20 and R21 for voltage division and detecting the output voltage of the coil 5, a diode D8 for rectifying a negative voltage and a thyristor SCR3 which is controlled in accordance with the voltage at the junction point of the resistors R20 and R21 and which forms a full-wave rectifying circuit when it is conductive. With this circuit configuration, the half-wave rectification takes place at a number of revolutions smaller than $N_2$ and the full-wave rectification is effected for a number of revolutions larger than $N_2$. Accordingly, the outputs at low and high speeds can be obtained from the single coil 5 and the outputs are opposite in amplitude to each other as shown in FIG. 12. The remaining functions and operation of this circuit are the same as that shown in FIG. 7 and therefore will be omitted.

In all the previous embodiments, the signal $v_{PB}$ for controlling the ignition advance is alone eliminated, but the signal $v_{PA}$ appearing later may be eliminated if it adversely affects the operation of the circuit.

According to this invention having such a structure as described above, the spark signal voltage $v_{PB}$ for ignition advance control can be determined depending only upon the manner of advancing the spark and the number of revolutions at which the ignition advance starts, but not on the maximum ignition advance position as essential in the prior art, so that the degree of freedom in the selection of the ignition advance characteristics required increases to effectively adapt the circuit for various ignition advance characteristics. Moreover, the maximum ignition advance position is represented by the pulse signal voltage $v_{PC}$ so that the accuracy of the ignition timing is considerably improved and the fluctuation range can be decreased to $\frac{1}{3}$ of that attainable by the conventional apparatus.

In conclusion, this invention can provide an inexpensive and highly reliable ignition apparatus in which the optimum ignition advance can be performed by a simple circuit configuration.

We claim:

1. An ignition apparatus for use with an internal combustion engine, comprising:
    an ignition coil connected with a power source and having primary and secondary windings;
    an electric switching element having a control electrode and being connected with said primary winding of said ignition coil to form a closed electric circuit therewith; and
    signal generating means connected to said control electrode for operating said electric switching element with an automatically-advancing ignition timing in accordance with the increase in the signal voltage obtained from said signal generating means resulting from the increase in the speed of the engine;
    said signal generating means comprising first signal generating means for delivering a first output at low engine speeds, second signal generating means for delivering a second output having a sloping characteristic covering a range of ignition angles representing a range of engine speeds over which the ignition is to be advanced, third signal generating means providing a third output at the maximum ignition advance position to limit advance of the ignition timing, and means for producing a composite output from said first, second and third outputs for application to said control electrode.

2. An ignition apparatus as claimed in claim 1, wherein said third signal generating means for fixing advance of said ignition timing includes a circuit having a reverse-connected diode for providing a negative output capable of fixing said ignition timing by providing a sharply-falling portion in the composite output at said maximum ignition advance position.

3. An ignition apparatus for use with an internal combustion engine, comprising:
    an ignition coil connected with a power source and having primary and secondary windings;
    an electric switching element having a control electrode and being connected with said primary winding of said ignition coil to form a closed electric circuit therewith; and
    signal generating means connected to said control electrode for operating said electric switching element with an automatically-advancing ignition timing in accordance with the increase in the signal voltage obtained from said signal generating means resulting from the increase in the speed of the engine;
    said signal generating means comprising first signal generating means for delivering a first output at low engine speeds, second signal generating means for delivering a second output having a sloping characteristic covering a range of ignition angles representing a range of engine speeds over which the ignition is to be advanced, means including a thyristor connected with said second signal generating means and controlled by a negative output of said second signal generating means for fixing the advance in the ignition timing at a maximum ignition advance position, third signal generating means for delivering a third output at high engine speeds, and means for producing a composite output from said first, second and third outputs for application to said control electrode.

4. An ignition apparatus for use with an internal combustion engine, comprising:
    an ignition coil connected with a power source and having primary and secondary windings;
    an electric switching element having a control electrode and being connected with said primary winding of said ignition coil to form a closed electric circuit therewith; and
    signal generating means connected to said control electrode for operating said electric switching element with an automatically-advancing ignition timing in accordance with the increase in the signal voltage obtained from said signal generating means resulting from the increase in the speed of the engine;

said signal generating means comprising first signal generating means for delivering a first output at low engine speeds, means connected to the output of said first signal generating means for detecting the signal voltage generated at high engine speeds and for changing over from half-wave to full-wave rectification and a second signal generating means for delivering a second output having a sloping characteristic covering a range of ignition angles, means including a thyristor connected in parallel with said second signal generating means and controlled by its negative output to fix the advance in ignition timing at the maximum ignition advance position, and means for producing a composite output from said first and second outputs for application to said control electrode.

* * * * *